(12) United States Patent
Liu

(10) Patent No.: US 11,648,649 B2
(45) Date of Patent: May 16, 2023

(54) TOOL CONNECTOR

(71) Applicant: Kuo-Han Liu, Taichung (TW)

(72) Inventor: Kuo-Han Liu, Taichung (TW)

( * ) Notice: Subject to any disclaimer, the term of this patent is extended or adjusted under 35 U.S.C. 154(b) by 68 days.

(21) Appl. No.: 17/351,397

(22) Filed: Jun. 18, 2021

(65) Prior Publication Data

US 2022/0080566 A1    Mar. 17, 2022

(30) Foreign Application Priority Data

Sep. 17, 2020 (TW) ................................. 109212267

(51) Int. Cl.
 *B25B 23/00* (2006.01)
 *B23B 31/107* (2006.01)
(52) U.S. Cl.
 CPC ...... *B25B 23/0035* (2013.01); *B23B 31/1071* (2013.01); *B25B 23/0021* (2013.01)
(58) Field of Classification Search
 CPC ............ B25B 23/0035; B25B 23/0021; B25B 31/1071; B25B 31/107; B25B 31/1079; B25B 31/28; B25B 2231/04
 USPC ............................. 81/177.2, 177.85; 279/143
 See application file for complete search history.

(56) References Cited

U.S. PATENT DOCUMENTS

| | | | |
|---|---|---|---|
| 8,240,233 B2* | 8/2012 | Huang | B25B 15/001 279/22 |
| 8,864,143 B2* | 10/2014 | Lin | B25B 23/0035 81/177.85 |
| 8,864,144 B2* | 10/2014 | Hsu | B23B 31/1173 279/143 |
| 2010/0101377 A1* | 4/2010 | Lai | B25B 23/0021 81/64 |
| 2017/0001290 A1 | 1/2017 | Liu | |

FOREIGN PATENT DOCUMENTS

TW    M369224 U    11/2009
TW    M521522 U    5/2016

\* cited by examiner

*Primary Examiner* — Don M Anderson
*Assistant Examiner* — Jason Khalil Hawkins
(74) *Attorney, Agent, or Firm* — Alan D. Kamrath; Karin L. Williams; Mayer & Williams PC

(57) ABSTRACT

The tool connector includes a socket having a receiving space and a through hole communicating the receiving space, a sliding member slidably received in the receiving space, a positioning member received in the receiving space, and a hook member. A funnel-shaped opening is formed at an end of the receiving space. The sliding member is connected to the socket with an end via a first elastic member, and the other end is for a tool bit to abut against. The positioning member is selectively inserted into the through hole. An end of the hook member is connected to the sliding member, and the other end has a hook portion for grasp the tool bit. When the positioning member is moved inward and the sliding member is moved toward the funnel-shaped opening, the hook portion is swingable in the funnel-shaped opening to release the tool bit.

8 Claims, 4 Drawing Sheets

TOOL CONNECTOR

FIELD OF THE INVENTION

The present disclosure relates to a tool connector, more especially to a tool connector which is able to quickly release or position the tool bit.

BACKGROUND OF THE INVENTION

A tool connector is usually used to connect a driving mechanism and a tool bit therebetween so that the tool bit can be driven to rotate by the driving mechanism. The tool bit is usually inserted into a socket of the tool connector and is grasped by the restriction structure of the tool connector. Thereby, the tool bit is prevented from detaching during rotation.

The restriction structure is various in structure in prior arts. For example, a magnetic member is used to position the tool bit in patent TW M521522. In patents TW M369224 and TW I526286, a sliding sleeve is used to control the rolling ball or the positioning member to grasp the tool bit or to release the tool bit. Besides, patent TW I362312 has a U-shaped elastic plate having a hook portion at a front end thereof. When the outer sleeve slides backward, the hook portion is exposed to become swingable so that the tool bit can be released from the hook portion. When the outer sleeve slides forward, the hook portion is restricted by the outer sleeve to be unable to swing outward so that the hook portion is embedded in the positioning groove on the tool bit to prevent the tool bit from detaching.

However, the structure including the outer sleeve and the inner tube has a large volume to make the tool connector too big. In addition, the rolling ball or the positioning member may jam sometime. Besides, the switching of release mode and positioning mode is made by sliding the outer sleeve by hand, so it is easy to be accidentally pushed. To prevent the outer sleeve from being accidentally pushed, a locking mechanism is necessary so that the tool connector becomes inconvenient to use.

The present invention is, therefore, arisen to obviate or at least mitigate the above mentioned disadvantages.

SUMMARY OF THE INVENTION

One of the objects of the present invention is to provide a tool connector having a simple structure and being easy to use to quickly grasp or release the tool bit.

To achieve the above and other objects, the present invention provides a tool connector for a tool bit to insert therein. The tool bit has a working end and a connection end at two opposite ends thereof. The tool bit is formed with at least one positioning groove on a peripheral face of thereof between the working end and the connection end. The tool connector includes a socket assembly, a sliding member, a first elastic member, a positioning member, a second elastic member, and a hook member.

The socket assembly includes a socket body. The socket body has a tube-shaped receiving space extending along an axial direction. The socket body is formed with a through hole on a peripheral wall thereof wherein the through hole communicates the receiving space. Two ends of the socket body along the axial direction are defined as a first end and a second end. A funnel-shaped opening expanding outward is formed at the first end to communicate the receiving space.

The sliding member is slidably arranged in the receiving space. The first elastic member is biased between the sliding member and the second end of the socket body so that the sliding member tends to move toward the first end. An end of the sliding member remote from the first elastic member is defined as a receiving end for the connection end of the tool bit to abut against.

The positioning member is received in the receiving space. The second elastic member is biased between the positioning member and the sliding member. The sliding member is selectively inserted into the through hole of the socket body to prevent the sliding member from sliding with respect to the socket body.

The hook member is arranged beside the inner wall of the receiving space. An end of the hook member is connected to the sliding member so that the hook member is linked with the sliding member. An other end of the hook member is formed with at least one hook portion. The at least one hook portion extends toward a central axis of the socket body in order to insert into the at least one positioning groove of the tool bit. The end of the hook member having the at least one hook portion is swingable along a radial direction.

When the positioning member is received in the through hole of the socket body, the at least one hook portion of the hook member is located between the funnel-shaped opening and the second end, and the end of the hook member having the at least one hook portion is restricted by the socket body to be unable to swing outward along the radial direction. Thus, the tool bit is grasped by the hook portion to be unable to detach from the socket body. When the positioning member is moved back into the receiving space and the sliding member is moved toward the first end of the socket body due to the first elastic member, the end of the hook member having the at least one hook portion is located at the funnel-shaped opening and is swingable along the radial direction so that the at least one hook portion is able to leave the at least one positioning groove to release the tool bit.

Thereby, the tool connector of the present invention is adapted for the tool bits to insert therein easily, and it is easy to release and to grasp the tool bit. Besides, the components of the tool connector is simplified so that the cost is reduced and that the tool connector can be lighter and thinner.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

The present disclosure can be more fully understood by reading the following detailed description of the embodiment, with reference made to the accompanying drawings as follows.

DETAILED DESCRIPTION OF THE PREFERRED EMBODIMENTS

Figure 1:
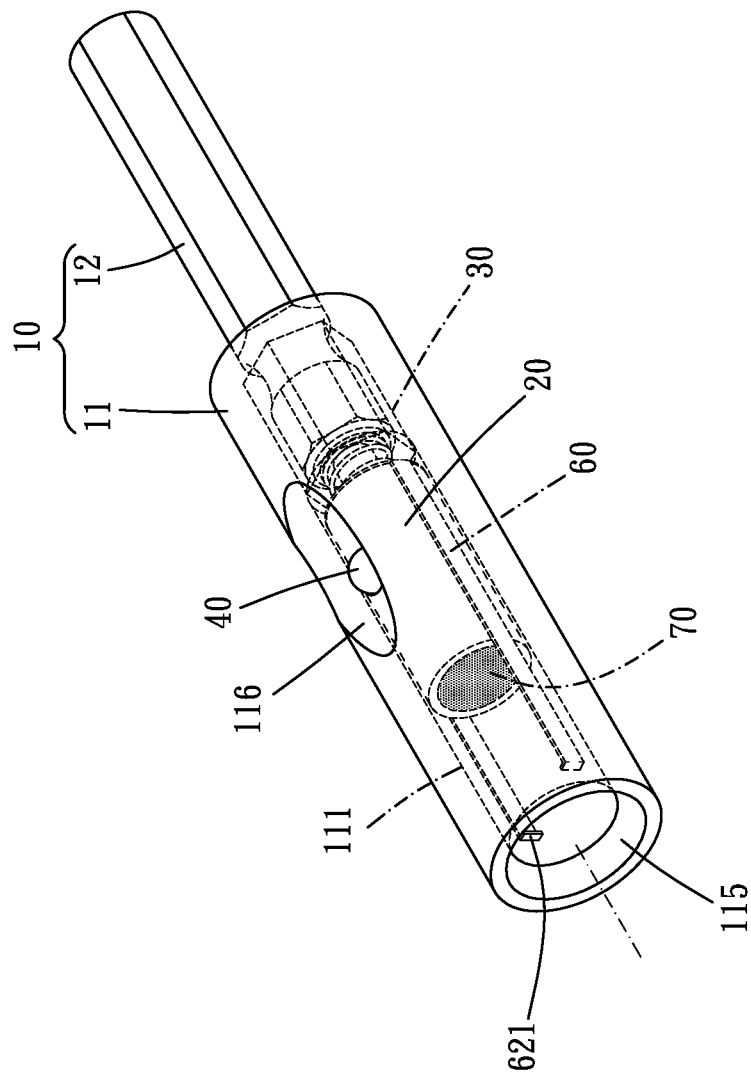
FIG. 1 is a stereogram of the present invention.
Figure 2:
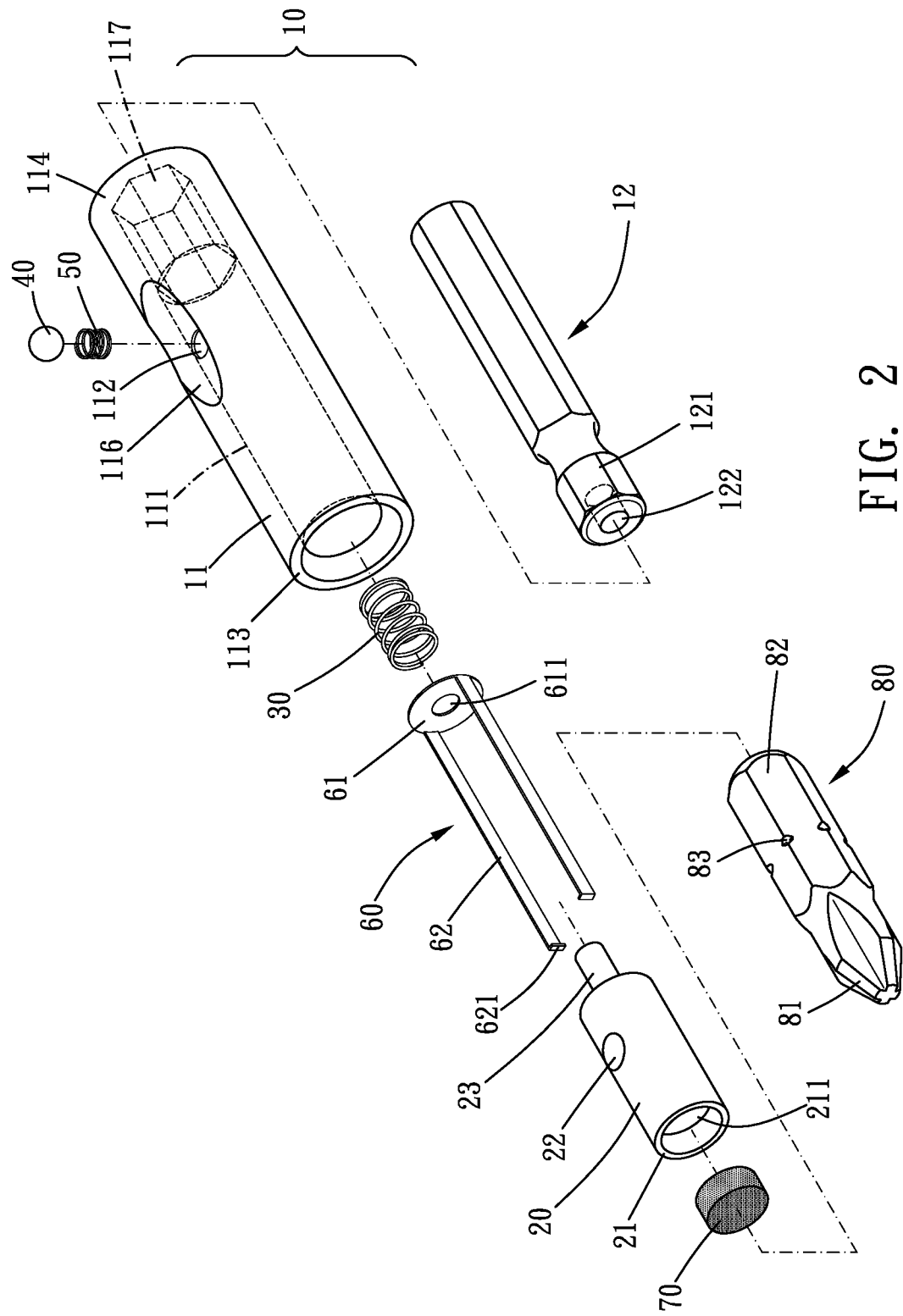
FIG. 2 is a breakdown drawing of the present invention.

Please refer to FIG. 1 to FIG. 6, the present invention provides a tool connector for a tool bit 80 to insert therein.

Two opposite ends of the tool bit 80 are defined as a working end 81 and a connection end 82 respectively. The tool bit 80 is formed with at least one positioning groove 83 on a peripheral wall thereof between the working end 81 and the connection end 82. In the present embodiment, the tool bit 80 is polygonal column-shaped and has a plurality of said positioning grooves 83. The positioning grooves 83 are formed on junctions between adjacent faces of the tool bit 80, and each of the positioning grooves 83 is a notch. The tool connector includes a socket assembly 10, a sliding member 20, a first elastic member 30, a positioning member 40, a second elastic member 50, and a hook member 60.

The socket assembly 10 includes a socket body 11. The socket body 11 is formed with a tube-shaped receiving space 111 extending along an axial direction. The socket body 11 is formed with a through hole 112 on a peripheral wall thereof. The through hole 112 communicates the receiving space 111. Two ends of the socket body 11 along the axial direction are defined as a first end 113 and a second end 114. A funnel-shaped opening 115 expanding outward is formed at the first end 113. In the present embodiment, the socket assembly 10 further includes a shaft body 12. The shaft body 12 has a polygonal column section 121 at an end thereof. The socket body 11 is formed with a polygonal hole 117 at the second end 114 wherein the polygonal hole 117 communicates the receiving space 111. The polygonal column section 121 is inserted into the polygonal hole 117 so that the shaft body 12 is engaged with the socket body 11.

The sliding member 20 is slidably arranged in the receiving space 111. The first elastic member 30 is biased between the sliding member 20 and the second end 114 of the socket body 11 so that the sliding member 20 tends to slide toward the first end 113. An end of the sliding member 20 remote from the first elastic member 30 is a receiving end 21 for the connection end 82 of the tool bit 80 to abut against. In the present embodiment, the first elastic member 30 is a spring and is biased between the sliding member 20 and a terminal end of the polygonal column section 121. A recess 211 is formed axially on the receiving end 21 of the sliding member 20. A magnetic member 70 is received in the recess 211 to be fixed to the sliding member 20. The magnetic member 70 is adapted for attracting the connection end 82 of the tool bit 82.

The positioning member 40 is received in the receiving space 111. The second elastic member 50 is biased between the positioning member 40 and the sliding member 20. The positioning member 40 is selectively inserted into the through hole 112 of the socket body 11 to prevent the sliding member 20 from sliding with respect to the socket body 11. In the present embodiment, the sliding member 20 is formed with a receiving groove 22 on the outer face thereof wherein the receiving groove 22 extends radially. The second elastic member 50 is received in the receiving groove 22. The positioning member 44 is at least partially received in the receiving groove 22. The second elastic member 50 is preferably a spring, and the positioning member 40 is preferably a rolling ball.

The hook member 60 is arranged beside the inner wall of the receiving space 111. An end of the hook member 60 is connected to the sliding member 20 to be linked with the sliding member 20. The other end of the hook member 60 is formed with at least one hook portion 621. The at least one hook portion 621 extends toward a central axis of the socket body 11 for inserting into the at least one positioning groove 83 of the tool bit 80. An end of the hook member 60 having the at least one hook portion 621 is swingable along the radial direction. In the present embodiment, the hook member 60 is composed of a seat 61 and two extension arms 62. The seat 61 is sandwiched between the sliding member 20 and the first elastic member 30. The two extension arms 62 parallel extend from the seat 61 toward a same direction on the axial direction along the inner wall of the receiving space 111. A free end of each of the extension arms 62 is formed with one of the hook portions 621 extending toward another extension arm 62. The length of each of the extension arm 62 depends on the length of the sliding member 20 and the position of the positioning groove 83 of the tool bit 80.

More specifically, in the present embodiment, the sliding member 20 is formed with an insertion pin 23 at an end thereof closer to the shaft body 12. The shaft body 12 is formed with an insertion hole 122 on a terminal end of the polygonal column section 121 wherein the insertion hole 122 extends along the axial direction. The first elastic member 30 is sleeved onto the insertion pin 23. The insertion pin 23 is slidably inserted into the insertion hole 122. The seat 61 is formed with a central hole 611. The seat 61 is sleeved onto the insertion pin 23 of the sliding member 20 with the central hole 611 so that the seat 61 is sandwiched between the sliding member 20 and the first elastic member 30. Thereby, the hook member 60 is positioned well.

Preferably, the socket body 11 is formed with a concave groove 116 which is enclosed by an arc concave face. The size and the shape of the concave groove 116 depend on the contour of the finger pulp. The through hole 112 is formed on the bottom of the concave groove 116. That is, the through hole 112 is lower than the outer surface of the socket body 11. More preferably, when the positioning member 40 is inserted into the through hole 112, the exposed portion of the positioning member 40 is not protruded above the outer surface of the socket body 11. Thus, when holding the socket body 11 with hand, the positioning member 40 is prevented from being pressed accidentally if the user doesn't press the concave groove 116 with the finger pulp. That is, the tool bit is prevented from being released accidentally. However, the tool bit 80 is still easy to release when the finger pulp is placed on the concave groove 116 to press the positioning member 40.

Figure 3:
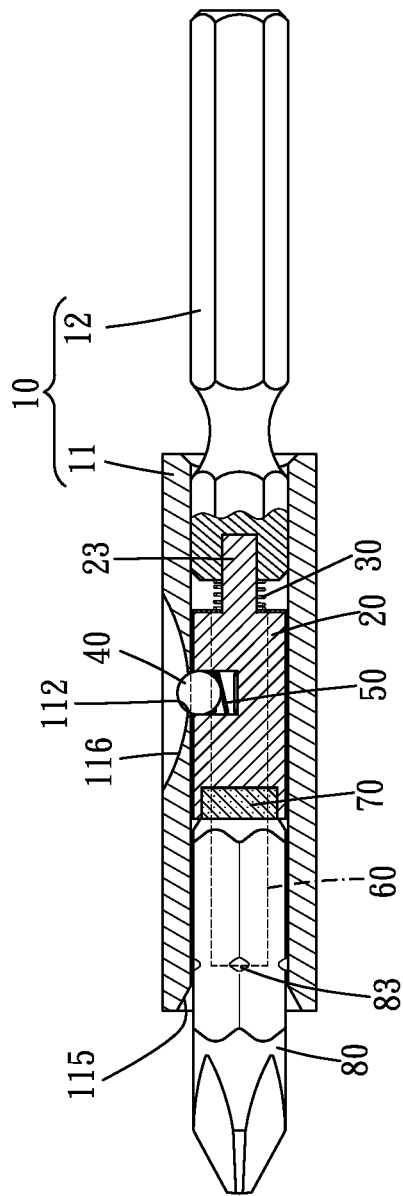
FIG. 3 is a section view of the present invention.
Figure 4:
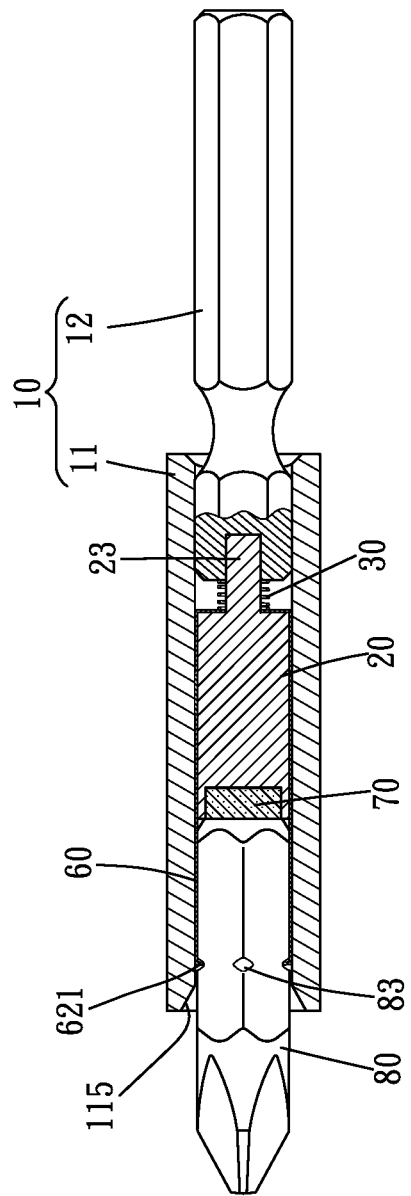
FIG. 4 is a section view of an other angle of the present invention.
Figure 5:
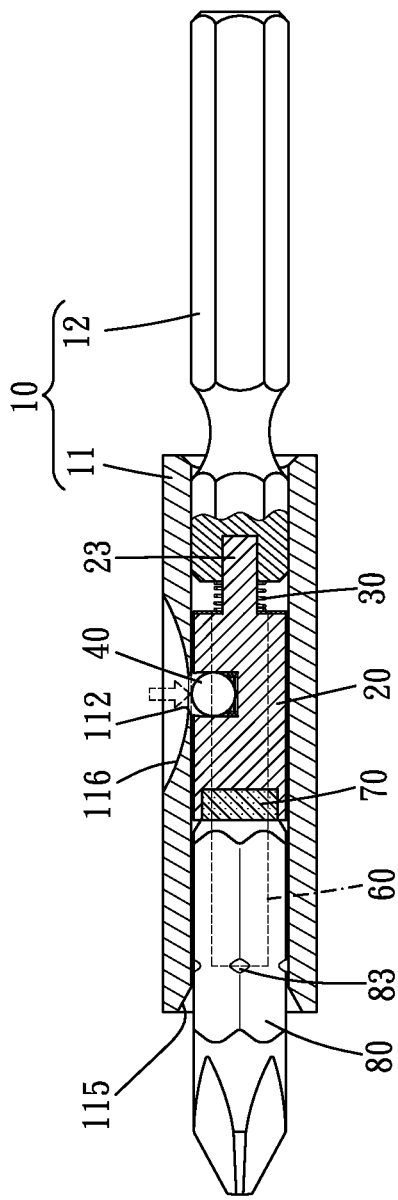
FIG. 5 is an illustration of the present invention.

As shown in FIG. 3 and FIG. 4, when the positioning member 40 is partially received in the through hole 112 of the socket body, the sliding member 20 is unable to slide with respect to the socket body 11. At this time, the at least one hook portion 621 of the hook member 60 is located between the funnel-shaped opening 115 and the second end, and the end of the hook member 60 having the at least one hook portion 621 is blocked by the socket body 11 to be unable to swing outward so that the tool bit 80 is positioned by the hook portion 621 and is prevented from leaving the socket body 11. On the contrary, as shown in FIG. 5 and FIG. 6, when the positioning member 40 is pressed inward to move back to the receiving space and the sliding member 20 is moved toward the first end of the socket body 11 due to the elastic force of the first elastic member 30, the end of the hook member 60 having the at least one hook portion 621 is located at the funnel-shaped opening 115 to be swingable radially so that the at least one hook portion 621 is able to leave the at least one positioning groove 83 to release the tool bit 80.

Figure 6:
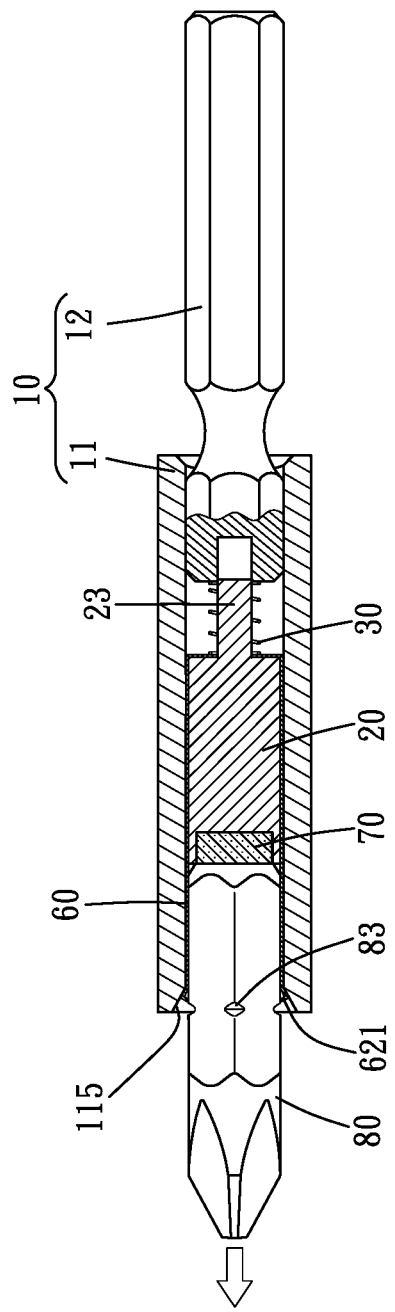
FIG. 6 is an illustration of an other angle of the present invention.

In use, the normal position of the sliding member 20 is shown in FIG. 6. At this time, the tool bit 80 can be inserted into the socket body 11 via the funnel-shaped opening 115 to adhere to the magnetic member 70, and then the tool bit 80 can be pushed inward to compress the first elastic member 30 until the positioning member 40 is moved to the through hole to insert into the through hole so that the sliding member 20 is positioned, as shown in FIG. 3 and FIG. 4. When the tool bit 80 is entering the socket body, the hook portion 621 is moved into the receiving space to be restricted by the inner wall of the socket body 11 and is inserted into the positioning groove 83 of the tool bit 80 to grasp the tool bit 80. On the contrary, when releasing the tool bit 80 as shown in FIG. 5 and FIG. 6, the positioning member 40 is pressed to move back into the receiving space to make sliding member 20 slidable. Due to the elastic force of the first elastic member 30, the sliding member 20 is pushed outward so that the hook portion 621 is moved to the funnel-shaped opening 115. Thus, the funnel-shaped opening 115 provides space for the hook portion 621 to swing radially. When the tool bit 80 is pulled out, the hook portion 621 can swing outward so that the tool bit 80 is not restricted by the hook portion 621 anymore.

In conclusion, the present invention provides a tool connector having a simple structure. In addition, the tool connector is easy to use to position the tool bit or to release the tool bit, and the cost and the weight are reduced. Furthermore, the releasing mechanism is hard to be triggered accidentally.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tool connector, adapted for a tool bit to insert therein, the tool bit having a working end and a connection end at opposite ends, the tool bit being formed with at least one positioning groove on a peripheral wall of the tool bit between the working end and the connection end, the tool connector including:
   a socket assembly, including a socket body and a rod body, the socket body being formed with a tube-shaped receiving space extending along an axial direction, the socket body being formed with a through hole communicating the receiving space and exterior, two ends of the socket boy along the axial direction being defined as a first end and a second end, a funnel-typed opening being formed from the receiving space at the first end, an inner diameter of the funnel-typed opening increasing outward, the rod body having a polygonal column section at an end thereof, the socket body being formed with a polygonal hole at the second end, the polygonal hole communicating the receiving space, the polygonal column section of the rod body being inserted into the polygonal hole so that the rod body is engaged with the socket body;
   a sliding member and a first elastic member, the sliding member being slidably arranged in the receiving space, the first elastic member being biased between the sliding member and a terminal end of the polygonal column section so that the sliding member tends to move toward the first end, an end of the sliding member remote from the first elastic member being defined as a receiving end, the receiving end being adapted for the connection end of the tool bit to abut against;
   a positioning member and a second elastic member, the positioning member being received in the receiving space, the second elastic member being biased between the positioning member and the sliding member, the positioning member being selectively embedded into the through hole of the socket body to prevent the sliding member from sliding with respect to the socket body;
   a hook member, arranged in the receiving space to be located beside an inner wall of the receiving space, an end of the hook member being connected to the sliding member to be linked with the sliding member, an other end of the hook member being formed with at least one hook portion, the at least one hook portion extending toward a central axis of the socket body and being adapted for hooking on the at least one positioning groove of the tool bit, an end of the hook member having the at least one hook portion being elastic to be swingable along a radial direction of the socket body;
   wherein when the positioning member is received in the through hole of the socket body, the at least one hook portion of the hook member is located between the funnel-shaped opening and the second end, the end of the hook member having the at least one hook portion is blocked by the socket body to be unable to swing outward along the radial direction so that the tool bit is grasped by the at least one hook portion to be prevented from leaving the socket body;
   wherein when the positioning member is moved into the receiving space, the sliding member slide toward the first end of the socket body due to the first elastic member, the end of the hook member having the at least one hook portion is located in the funnel-shaped opening to be swingable outward along the radial direction so that the at least one hook portion is able to be move away from the at least one positioning groove to release the tool bit.

2. The tool connector of claim 1, wherein the sliding member is formed with a pin extending from an end thereof closer to the rod body, an insertion hole extending axially is formed on the terminal end of the polygonal column section of the rod body, the first elastic member is sleeved onto the pin, the pin is slidably inserted into the insertion hole.

3. The tool connector of claim 2, wherein the hook member is composed of a seat and two extension arms, the seat is formed with a central hole so that the seat is sleeved onto the pin of the sliding member by the central hole, thereby the seat is sandwiched by the sliding member and the first elastic member, the two extension arms parallel extend from two sides of the seat toward a same direction along the axial direction respectively, a free end of each of the two extension arms extends toward the other extension arm to form one of the hook portions.

4. The tool connector of claim 1, wherein the hook member is composed of a seat and two extension arms, the seat is sandwiched by the sliding member and the first elastic member, the two extension arms parallel extend from two sides of the seat toward a same direction along the axial direction respectively, a free end of each of the two extension arms extends toward the other extension arm to form one of the hook portions.

5. The tool connector of claim 1, wherein the sliding member is radially formed with a receiving groove on an outer face thereof, the second elastic member is received in the receiving groove, the positioning member is at least partially received in the receiving groove.

6. The tool connector of claim 1, wherein the socket body is formed with a concave groove on an outer face thereof, the concave groove has an arc-shaped surface, the through hole is formed on a bottom of the concave groove.

7. The tool connector of claim 1, further including a magnetic member, the sliding member being axially formed with a recess at the receiving end thereof, the magnetic member being received in the recess to be fixed to the sliding member.

8. The tool connector of claim 1, wherein the positioning member is a rolling ball, each of the first elastic member and the second elastic member is a spring.

* * * * *